United States Patent [19]

Raynor

[11] Patent Number: 4,870,713
[45] Date of Patent: Oct. 3, 1989

[54] SELF CLEANING TRUCK MIRROR

[76] Inventor: George L. Raynor, Rte. 1, Box 50, Verona, Mo. 65769

[21] Appl. No.: 222,046

[22] Filed: Jul. 21, 1988

[51] Int. Cl.$^4$ .............................................. B60S 1/48
[52] U.S. Cl. .............................. 15/250.01; 15/250 B; 15/250.26
[58] Field of Search ............ 15/250 B, 250.29, 250.26; 350/582, 583, 636

[56] References Cited

U.S. PATENT DOCUMENTS

| 1,269,022 | 6/1918 | Triipe | 222/155 |
| 1,766,224 | 6/1930 | Montevaldo | 15/250.26 X |
| 3,526,920 | 9/1970 | Boyanich, Sr. | 15/250 B |
| 4,466,712 | 8/1984 | Vitaloni | 15/250 B X |
| 4,763,381 | 8/1988 | Williams | 15/250 B |

FOREIGN PATENT DOCUMENTS 2063661 6/1981 United Kingdom ............... 15/250 B

Primary Examiner—Peter Feldman

[57] ABSTRACT

A self cleaning truck mirror has a housing which contains a tank for storing washer fluid. A wiper is mounted for reciprocation across the face of the mirror by a mechanism within the housing. The reciprocating mechansim includes a carriage screw provided with crossing helical opposite hand threads. The screw is rotated by a motor within the housing through a bevel gear arrangement. A limit switch is provided for parking the wiper. The mirror is provided with tubular supports for mounting on a truck body. The housing is rotatably mounted on the supports, and a motor driven gear drive within the housing allows the mirror to be rotatably adjusted with respect to the tubular supports. Limit switches control the range of adjustment. A pump motor within the housing supplies washer fluid from the tank to spray nozzles at the top of the mirror. All control wiring extends through the tubular supports for enabling control of all the motors from within the cab of the truck.

11 Claims, 4 Drawing Sheets

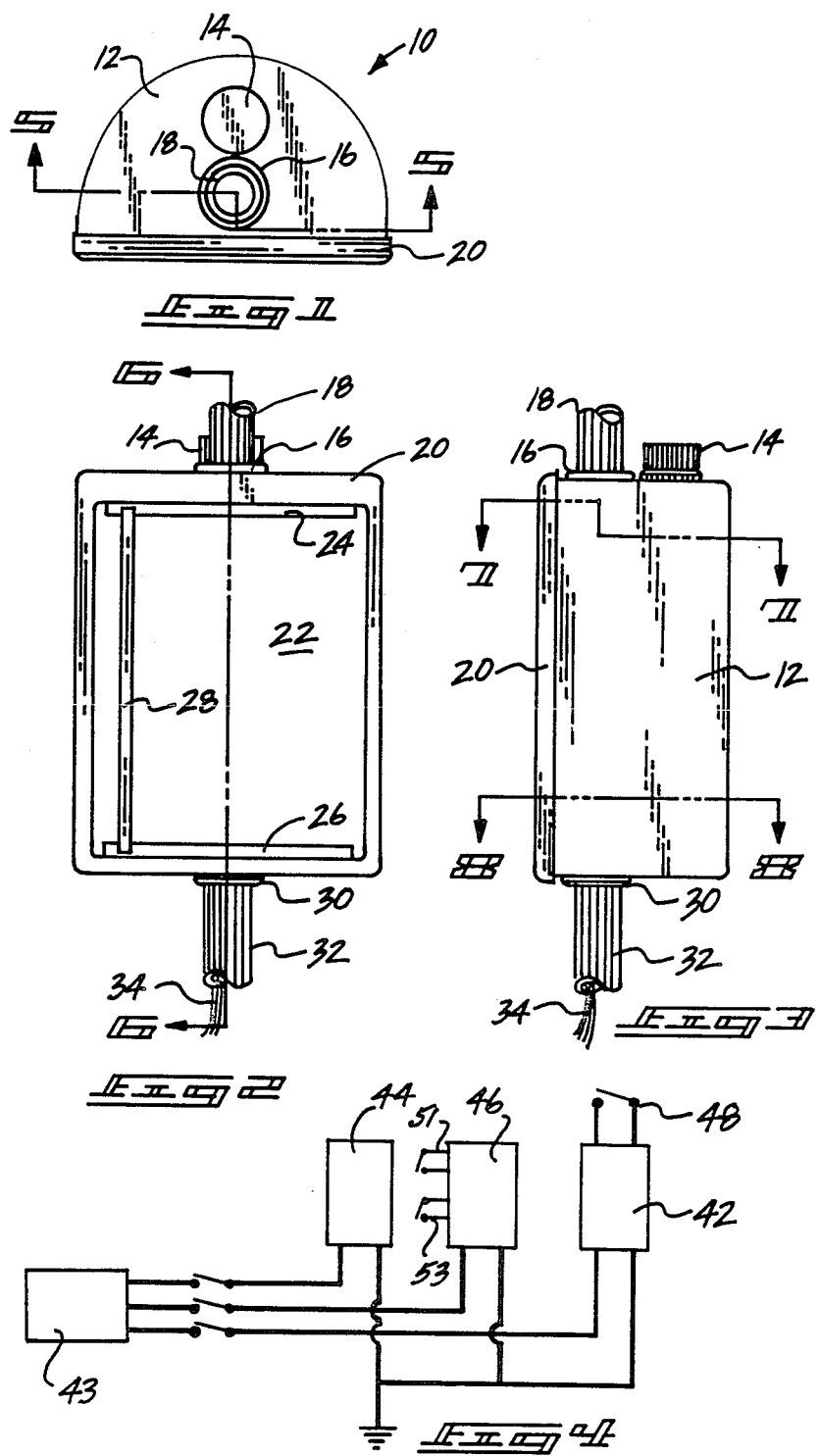

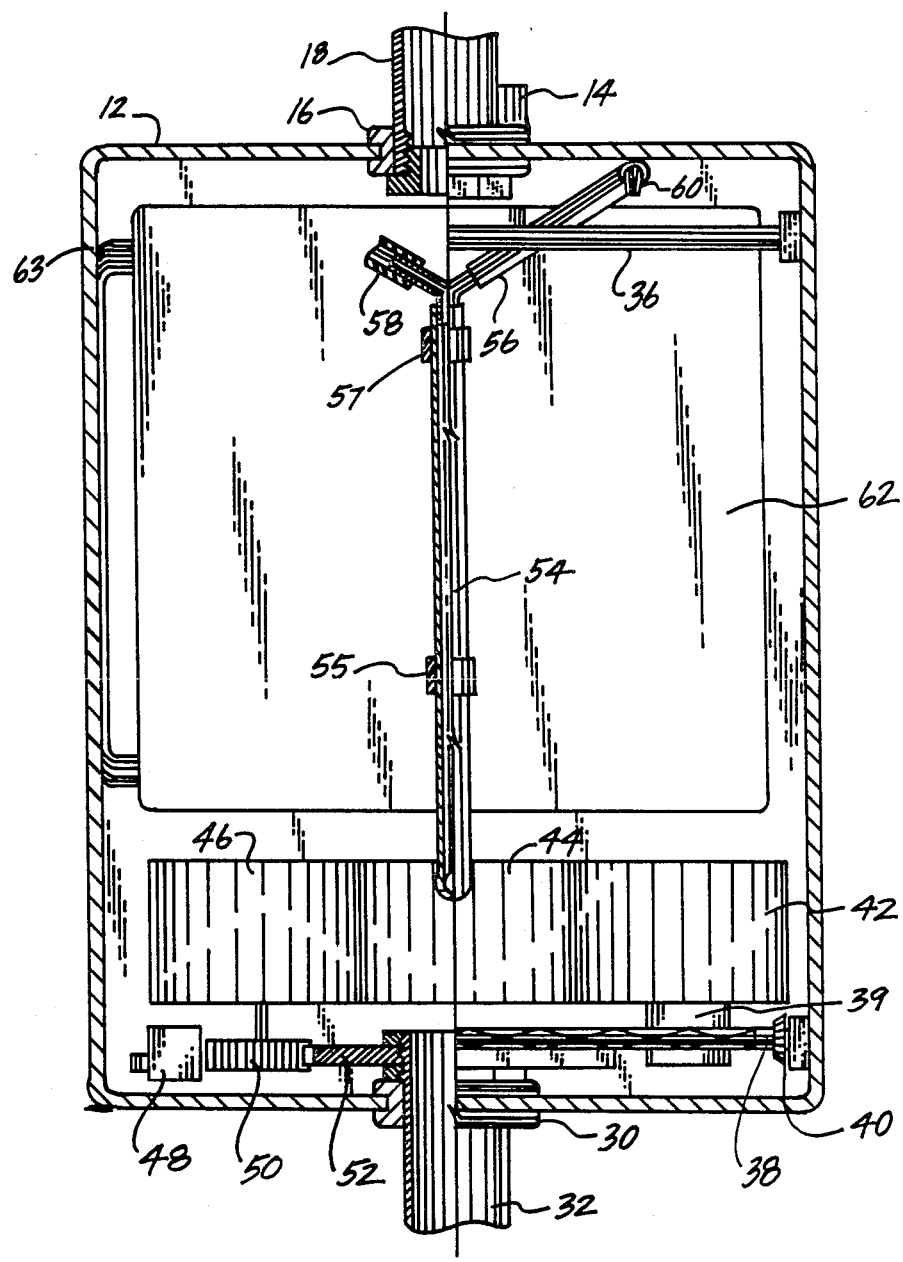

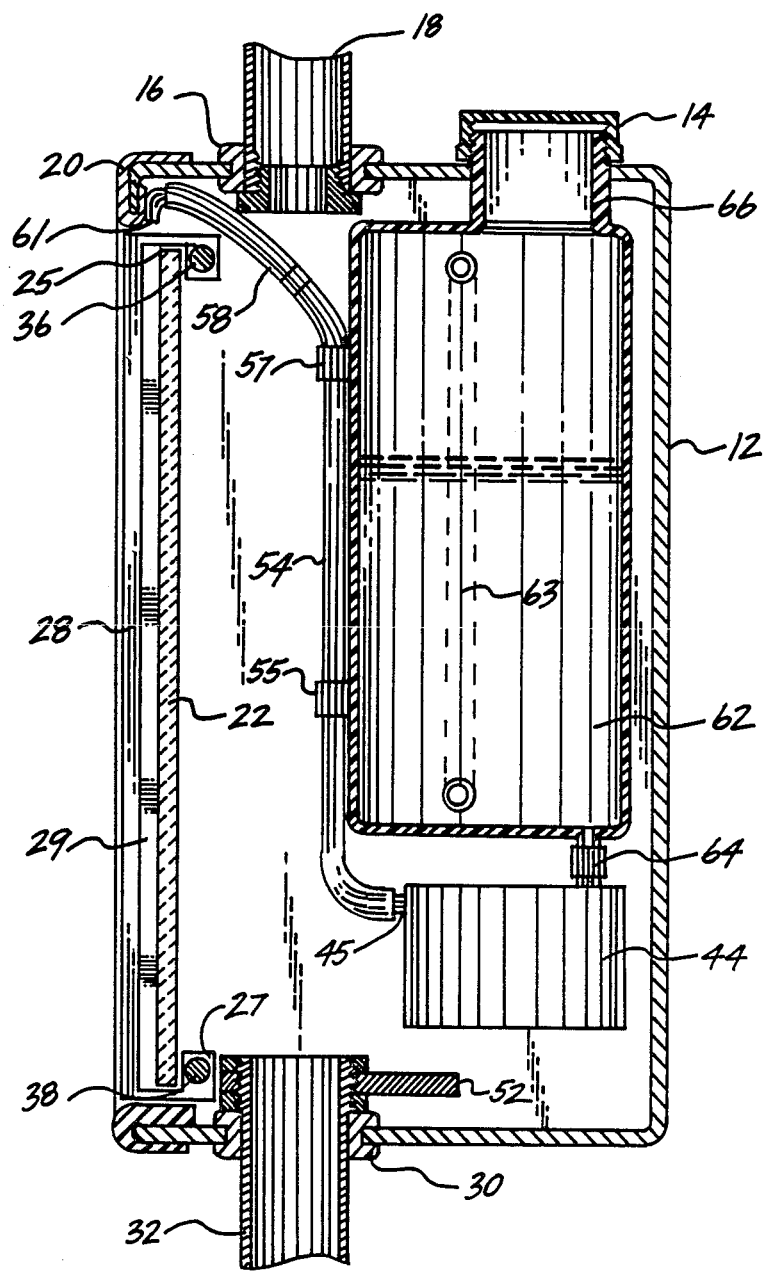

SELF CLEANING TRUCK MIRROR

BACKGROUND OF THE INVENTION

1. Field of the Invention

The present invention relates to self cleaning truck mirrors, and more particularly pertains to a new and improved self cleaning mirror which allows the mirror to be adjusted and cleaned from within the cab of the truck. Mirrors on large trucks are particularly vital during backing of the truck. In order to provide a proper rear view, the angle of the mirror must be adjusted as the angle of the trailer with respect to the tractor is altered. Further, such truck mirrors are prone to becoming contaminated by dirt and insects such that a proper view is not available. Frequently, these truck mirrors must be cleaned and adjusted during inclement weather or while operating the truck. In order to enable a truck mirror to be conveniently cleaned and adjusted without necessitating stopping of the truck or forcing the driver to leave the cab, the present invention provides a truck mirror having self contained mechanisms for dispensing washer fluid, reciprocating a wiper across the mirror, and for adjusting the angle of the mirror.

2. Description of the Prior Art

Various types of self cleaning truck mirrors are known in the prior art. A typical example of such a self cleaning truck mirror is to be found in U.S. Pat. No. 2,913,754, which issued to C. Vander Zee on Nov. 24, 1959. This patent discloses a mirror having a housing containing a fluid or vacuum actuated motor. A conduit through the mirror support provides power to the motor. A pivotally mounted wiper traverses across the mirror. Due to the pivotal mounting, the wiper does not clean the entire surface of the mirror. U.S. Pat. No. 3,413,676, which issued to 0. Engel on May 19, 1967, discloses a rear view mirror provided with a pivotal wiper. A linkage connects the mirror wiper arm to the windshield wiper linkage of the vehicle. Due to the arcuate motion of the wiper across the face of the mirror, some surfaces of the mirror are not cleaned. U.S. Pat. No. 3,455,624, which issued to R. Godfrey on July 15, 1969, discloses a truck mirror which provides a fluid conduit to conduct washer fluid across the surface of a rear view mirror. An air deflector is utilized to deflect air across the face of the mirror and to entrain the washer fluid in the air stream. U.S. Pat. No. 3,685,087, which issued to M. Pittman on Aug. 22, 1972, discloses a truck mirror having a reciprocal wiper. An electric motor in conjunction with a chain and sprocket drive is utilized to traverse the wiper arm vertically across the face of the mirror. U.S. Pat. No. 3,866,258, which issued to F. De Graw on Feb. 18, 1975, discloses a wiper assembly for a side mounted rear view truck mirror which includes a wiper blade arranged for transverse linear movement across the mirror surface. A pair of spaced parallel transversely extending fluid power cylinders are mounted on the rear side of the mirror mounting frame and have their piston rods respectively connected to the wiper blade. U.S. Pat. No. 4,339,169, which issued to K. Addison on July 13, 1982, discloses a side mounted rear view truck mirror having a wiper assembly. The wiper arm is actuated for transverse reciprocal linear motion by an electric motor and an eccentric cam linkage. U.S. Pat. No. 4,466,712, which issued to A. Vitaloni on Aug. 21, 1984, discloses an external rear view mirror having an enclosed wiper actuation mechanism for traversing a wiper arm across the face of the mirror. A remotely actuatable mechanism for adjusting the angle of the mirror is also provided. A single reversible electric motor within the mirror housing in conjunction with remote actuatable clutches allows for alternative actuation of the wiper or the angle adjustment mechanism. This construction is disadvantageous in that concurrent operation of the wiper and angular adjustment mechanisms are precluded.

While the above mentioned devices are suited for their intended usage, none of these devices provide a side mounted rear view truck mirror having a self contained washer fluid tank having an externally visible sight glass. Additionally, none of the aforesaid self cleaning rear view truck mirrors provides a wiper actuated for reciprocal transverse linear movement by a carriage screw having crossing opposite hand helical threads. An additional feature of the present invention, not contemplated by the aforesaid prior art devices, is the provision of a washer fluid pump motor, a wiper actuation motor and an angle adjustment motor within the housing of a side mounted rear view mirror. Inasmuch as the art is relatively crowded with respect to these various types of self cleaning truck mirrors, it can be appreciated that there is a continuing need for and interest in improvements to such self cleaning truck mirrors, and in this respect, the present invention addresses this need and interest.

SUMMARY OF THE INVENTION

In view of the foregoing disadvantages inherent in the known types of self cleaning truck mirrors now present in the prior art, the present invention provides an improved self cleaning truck mirror. As such, the general purpose of the present invention, which will be described subsequently in greater detail, is to provide a new and improved self cleaning truck mirror which has all the advantages of the prior art self cleaning truck mirrors and none of the disadvantages.

To attain this, a representative embodiment of the concepts of the present invention is illustrated in the drawings and makes use of a housing which contains a tank for storing washer fluid. A wiper is mounted for reciprocation across the face of the mirror by a mechanism within the housing. The reciprocating mechanism includes a carriage screw provided with crossing helical opposite hand threads. The screw is rotated by a motor within the housing through a bevel gear arrangement. A limit switch is provided for parking the wiper. The mirror is provided with tubular supports for mounting on a truck body. The housing is rotatably mounted on the supports, and a motor driven gear drive within the housing allows the mirror to be rotatably adjusted with respect to the tubular supports. Limit switches control the range of adjustment. A pump motor within the housing supplies washer fluid from the tank to spray nozzles at the top of the mirror. All control wiring extends through the tubular supports for enabling control of all the motors from within the cab of the truck.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self cleaning truck mirror which has all the advantages of the prior art self cleaning truck mirrors and none of the disadvantages.

It is another object of the present invention to provide a new and improved self cleaning truck mirror which may be easily and efficiently manufactured and marketed.

It is a further object of the present invention to provide a new and improved self cleaning truck mirror which is of a durable and reliable construction.

An even further object of the present invention is to provide a new and improved self cleaning truck mirror which is susceptible of a low cost of manufacture with regard to both materials and labor, and which accordingly is then susceptible of low prices of sale to the consuming public, thereby making such self cleaning truck mirrors economically available to the buying public.

Still yet another object of the present invention is to provide a new and improved self cleaning truck mirror which provides in the apparatuses and methods of the prior art some of the advantages thereof, while simultaneously overcoming some of the disadvantages normally associated therewith.

Still another object of the present invention is to provide a new and improved self cleaning truck mirror having a housing containing a wiper actuation motor, a washer fluid pump motor, an angle adjustment motor and a washer fluid storage tank.

Yet another object of the present invention is to provide a new and improved self cleaning tuck mirror which utilizes a wiper mounted for transverse reciprocal linear motion by a carriage screw having crossing opposite hand helical threads.

Even still another object of the present invention is to provide a new and improved self cleaning truck mirror which allows concurrent remote controlled wiping, remote controlled dispensing of washer fluid and remote controlled angular adjustment by a driver from the cab of the truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of the self cleaning truck mirror of the present invention.

FIG. 2 is a front view of the self cleaning truck mirror of the present invention.

FIG. 3 is a right side view of the self cleaning truck mirror of the present invention.

FIG. 4 is a schematic diagram illustrating the electrical components of the self cleaning truck mirror of the present invention.

FIG. 5 is a longitudinal cross section, taken along line 5—5 of FIG. 1, illustrating the internal operating mechanisms of the self cleaning truck mirror of the present invention.

FIG. 6 is a longitudinal cross sectional view, taken along line 6—6 of FIG. 2, illustrating the internal components of the self cleaning truck mirror of the present invention.

DESCRIPTION OF THE PREFERRED EMBODIMENT

Figure 7:
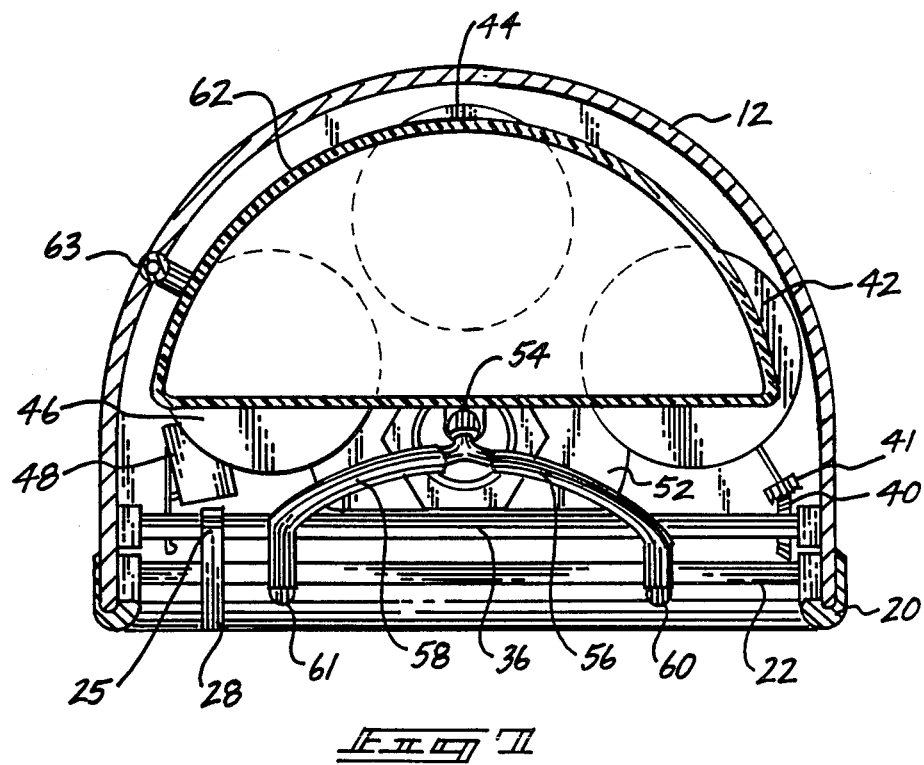
FIG. 7 is a transverse cross sectional view, taken along line 7—7 of FIG. 3, illustrating the internal components of the self cleaning truck mirror of the present invention.

With reference now to the drawings, and in particular to FIG. 1 thereof, a new and improved self cleaning truck mirror embodying the principles and concepts of the present invention and generally designated by the reference numeral 10 will be described.

More specifically, it will be noted that the first embodiment 10 of the invention includes an elongated housing 12 having an arcuate transverse cross sectional shape. The housing 12 is configured to provide reduced wind resistance, while at the same time providing adequate internal space for housing the various internal components of the mirror. A screw on cap 14 for a washer fluid storage tank within the housing 12 extends above the top surface of the housing 12. A bushing 16 within an aperture formed through the top surface of the housing 12 rotatably receives a tubular support 18. The support 18, in conjunction with a similar support 32 provided on a bottom surface of the housing, serves to mount the mirror 10 of the present invention to a truck body. A rubber sealing gasket 20 is provided around the periphery of the housing 12, and serves to prevent contamination of the interior components by dirt and water.

With reference now to FIG. 2, it may be seen that a mirror 22 forms a planar front face of the housing 12. The mirrored front face 22 of the housing 12 is provided with a pair of opposed slots 24 and 26 through which a wiper arm 28 is mounted for transverse reciprocal movement. The bottom housing support tube 32 is received for rotation in a bushing 30 disposed within an aperture formed in the bottom face of the housing 12. Electrical control wires 34, connected to various internal components of the mirror 10, extend through the bottom support tube 32 and into the cab of the truck.

In FIG. 3, a right side view of the mirror 10 of the present invention is provided.

In FIG. 4, a schematic diagram is provided, which illustrates the various electrical components of the mirror 10 of the present invention. A control switch 43 is mounted within the interior of the truck cab. An electrical washer fluid pump motor 44 is disposed in the interior of the mirror housing 10. A reversible motor 46 within the housing 12 allows the housing 12 to be rotated about the axis of the support tubes 18 and 32. A pair of limit switches 51 and 53 control the angular adjustment range of the mirror 10, by reversing the reversible motor 46. A third electric motor 42, disposed within the housing 12, drives the wiper arm 28 across the face of the mirror 22. A limit switch 48 determines the park position of the wiper arm 28 adjacent one side edge of the mirror 22.

In FIG. 5, a longitudinal cross sectional view of the mirror 10 of the present invention is provided. A washer fluid storage tank 62 is disposed within a top portion of the housing 12. A transparent sight glass 63 is visible through a window slit provided in the left hand side of the housing 12. The sight glass 63 enables the external monitoring of the fluid level within the tank 62. A conduit 54 connected to the output of a conventional electric washer pump 44 provides a flow of washer fluid to a pair of nozzle supply tubes 56 and 58. Any desired number of nozzles may be provided. A spray nozzle 60 is illustrated near the top right hand portion of FIG. 5. A gear segment 52 is rigidly secured to the lower support tube 32 by conventional threaded fasteners. The gear segment 52 meshes with a drive gear 50 on a rotary output shaft of a reversible electric motor 46. Actuation of the motor 46, which is secured to the housing 12, causes a relative rotation of the housing 12 with respect to the support tube 32. This allows angular adjustment of the mirror 10 of the present invention. A third electric motor 42 drives a carriage screw 38 via a gear reduction unit 39 which drives a bevel gear 40. The carriage screw 38 has slow pitch crossed helical threads of opposite hand. This enables the wiper 28 to be reciprocated back and forth across the face of the mirror 22, without requiring a reversible motor. A limit switch 48 positioned for engagement with the wiper arm 28 controls the parked position of the wiper arm 28. A pair of clips 55 and 57 secure the supply conduit 54 to the tank 62. A slide bearing rod 36 extends transversely across the housing 12. An upper end of the wiper arm 28 has a bearing block received for transverse reciprocal linear sliding movement on the rod 36.

In FIG. 6, another longitudinal cross sectional view of the mirror 10 of the present invention is provided. The washer fluid pump 44 has an inlet 64 communicating with the bottom of the tank 62. The outlet 45 of the pump 44 is connected to the washer fluid supply conduit 54. The wiper arm 28 has a wiper blade 29 and also has an upper bearing block 25 which is slidably received on the rod 36. A lower block 27 on the wiper arm 28 has a cam pin which is engaged in the helical thread on the rod 38. When the rod 38 is rotated, the wiper arm 28 will be traversed across the face of the mirror 22. Because of the opposite crossing portions of the helical thread, the wiper arm 28 will reverse directions at each end of the rod 38, thus alleviating the need for a reversible motor. Fluid may be added to the tank 62 by removing the cap 14 from the neck 66. The sight glass 63 enables monitoring of the level in the tank 62, without removing the cap 14.

In FIG. 7, a transverse cross sectional view of the mirror 10 of the present invention is provided. The threaded carriage screw 38 is rotated by a bevel gear 40 on the carriage screw 38 in engagement with a bevel gear 41 on a rotary output shaft of the gear reduction unit 39 of the electric motor 42. The engagement of the lower bearing block 27 with a limit switch 48 allows the wiper arm 28 to be parked adjacent a side edge of the mirror 22.

Figure 8:
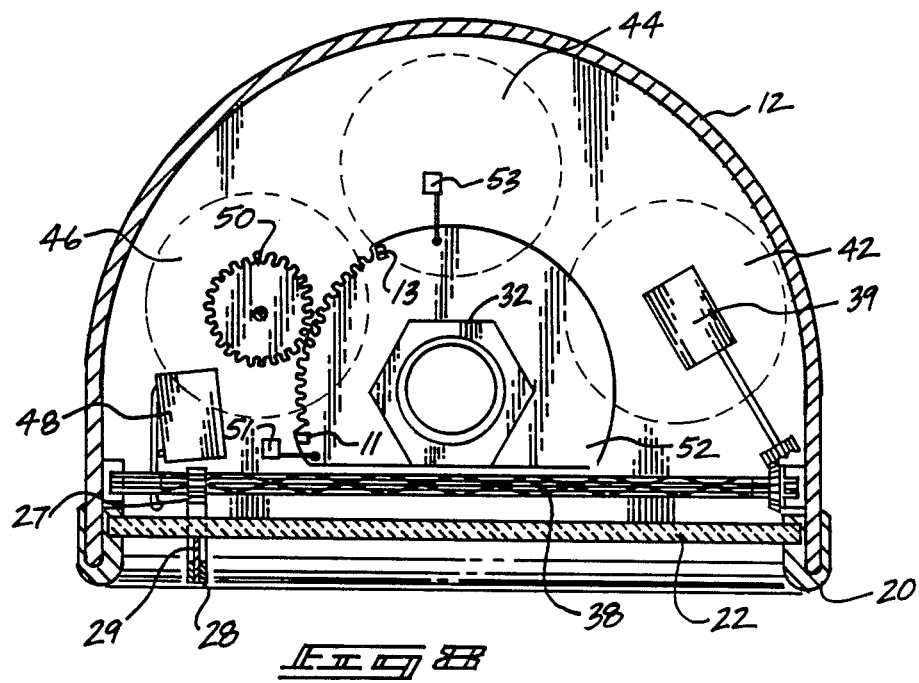
FIG. 8 is a transverse cross sectional view, taken along line 8—8 of FIG. 3, illustrating the internal components of the self cleaning truck mirror of the present invention.

In FIG. 8, another transverse cross sectional view of the mirror 10 of the present invention is provided. Angular adjustment of the mirror housing 12 with respect to the support tubes 18 and 32 is achieved by operation of a reversible electric motor 46. A gear 50 secured to the rotary output shaft of the motor 46 engages the gear sector 52. A pair of limit switches 51 and 53, which cooperate with raised protuberances 11 and 13 on the gear sector 52, control the range of angular adjustment by reversing the motor 46.

As may now be readily understood, the mirror of the present invention allows a driver to clean and adjust the angular position of the mirror without leaving the cab of the truck. In summary, the mirror of the present invention utilizes three self contained electrical motors and a self contained washer fluid storage tank to dispense washer fluid, to reciprocate a wiper and to rotate a mirror about a vertical axis.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved self cleaning truck mirror, comprising:
   a housing having an aerodynamically curved forwardly facing exterior surface and a planar rearwardly facing exterior surface;
   a mirror on said planar surface of said housing;
   a wiper for wiping said mirror;

a pair of parallel slots at opposite ends of said mirror, said slots communicating with an interior of said housing;

a pair of spaced parallel leg portions perpendicularly connected at opposite ends of said wiper, said leg portions extending through said slots into said housing interior;

an elongated slide bearing rod in said housing, said bearing rod extending in parallel relation adjacent one of said slots;

a bearing block attached to one of said leg portions at one end of said wiper and supported for sliding movement along said slide bearing rod;

a threaded carriage screw in said housing, said carriage screw having at least one helical thread and extending in parallel relation adjacent the other of said slots;

a wiper actuation electric motor in said housing; a first bevel gear connected to a rotary output shaft of a gear reduction unit on said wiper actuation electric motor; a second bevel gear on said carriage screw;

a second bearing block attached to the other of said leg portions at an end of said wiper opposite said first bearing block and having a cam pin in engagement with said helical thread on said carriage screw for reciprocating said wiper across said mirror;

means in said housing for spraying washer fluid on said mirror;

support means for mounting said housing on a truck; and means in said housing for rotating said mirror about said support means.

2. The self cleaning truck mirror of claim 1, wherein said carriage screw has crossing helical threads of opposite hand.

3. The self cleaning truck mirror of claim 1, further comprising limit switch means operatively connected to said wiper actuation electric motor for parking said wiper means adjacent an edge portion of said mirror.

4. The self cleaning truck mirror of claim 1, wherein said means for spraying washer fluid further comprises a washer fluid storage tank in said mirror housing.

5. The self cleaning truck mirror of claim 4, further comprising an electric pump in said housing having an intake connected to said washer fluid storage tank.

6. The self cleaning truck mirror of claim 5, further comprising a plurality of spray nozzles mounted adjacent said mirror and connected to an output of said pump.

7. The self cleaning truck mirror of claim 4, further comprising sight glass means on said housing for monitoring a fluid level in said washer fluid storage tank.

8. The self cleaning truck mirror of claim 1, wherein said housing support means comprises a first tubular support rod rotatably mounted adjacent a top of said housing and a second tubular support rod rotatably mounted adjacent a bottom of said housing.

9. The self cleaning truck mirror of claim 8, further comprising a gear rigidly mounted on one of said support tubes; and an angular adjustment motor in said housing operatively connected to said gear for rotating said housing relative to said support tubes.

10. The self cleaning truck mirror of claim 9, further comprising a pair of limit switches in said housing operatively connected to said angular adjustment motor for limiting the range of angular adjustment of said housing.

11. A new and improved self cleaning truck mirror, comprising:

a generally semi-cylindrical housing having an aerodynamic curved fordwardly facing exterior surface and a planar rearwardly facing exterior surface;

a mirror on said planar exterior surface of said housing;

an elongated wiper for wiping said mirror;

a pair of parallel slots at opposite ends of said mirror, said slots communicating with an interior of said housing;

a pair of spaced parallel leg portions perpendicularly connected at opposite ends of said wiper, said leg portions extending through said slots into said housing interior;

an elongated slide bearing rod in said housing, said bearing rod extending in parallel relation adjacent one of said slots;

a first bearing block attached to one of said leg portions at one end of said wiper and supported for sliding movement along said slide bearing rod;

a threaded carriage screw in said housing, said carriage screw having at least one helical thread and extending in parallel relation adjacent the other of said slots;

a wiper actuation electric motor in said housing; a first bevel gear connected to a rotary output shaft of a gear reduction unit on said wiper actuation electric motor; a second bevel gear on said carriage screw;

a second bearing block attached to the other of said leg portions at an end of said wiper opposite said first bearing block and having a cam pin in engagement with said helical thread on said carriage screw for reciprocating said wiper across said mirror;

a parking limit switch operatively connected to said wiper actuation electric motor for parking said wiper adjacent an edge portion of said mirror;

a washer fluid storage tank in said mirror housing;

an electric pump in said housing having an intake connected to said washer fluid storage tank;

a plurality of spray nozzles mounted adjacent said mirror and connected to an output of said pump;

a sight glass on said housing for monitoring a fluid level in said washer fluid storage tank;

a first tubular support rod rotatably mounted adjacent a top of said housing and a second tubular support rod rotatably mounted adjacent a bottom of said housing, said first and second tubular support rods adapted for securing said housing on an exterior portion of a truck;

a gear rigidly mounted on one of said support tubes;

an angular adjustment motor in said housing operatively connected to said gear for rotating said housing relative to said support tubes;

a pair of limit switches in said housing operatively connected to said angular adjustment motor for limiting the range of angular adjustment of said housing; and control leads connected with said wiper actuation motor, said pump and said adjustment motor, said control leads extending through a hollow interior of one of said tubular support rods for connection with control switches in an interior of a truck.

* * * * *